United States Patent
Kwon et al.

(10) Patent No.: US 9,444,085 B2
(45) Date of Patent: Sep. 13, 2016

(54) STACK TYPE BATTERY

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Moon-seok Kwon, Hwaseong-si (KR); Seung-sik Hwang, Seongnam-si (KR); Jeong-kuk Shon, Hwaseong-si (KR); Jae-man Choi, Hwaseong-si (KR); Jun-hwan Ku, Seoul (KR); Min-sang Song, Seongnam-si (KR)

(73) Assignees: SAMSUNG ELECTRONICS CO., LTD. (KR); SAMSUNG SDI CO., LTD. (KR)

(*) Notice: Subject to any disclaimer, the term of this patent is extended or adjusted under 35 U.S.C. 154(b) by 127 days.

(21) Appl. No.: 13/917,850

(22) Filed: Jun. 14, 2013

(65) Prior Publication Data
US 2014/0170467 A1 Jun. 19, 2014

(30) Foreign Application Priority Data
Dec. 14, 2012 (KR) .................. 10-2012-0146627

(51) Int. Cl.
*H01M 2/18* (2006.01)
*H01M 4/70* (2006.01)
*H01M 10/04* (2006.01)
*H01M 2/30* (2006.01)

(52) U.S. Cl.
CPC ............. *H01M 2/18* (2013.01); *H01M 4/70* (2013.01); *H01M 10/04* (2013.01); *H01M 2/30* (2013.01)

(58) Field of Classification Search
None
See application file for complete search history.

(56) References Cited

U.S. PATENT DOCUMENTS

| | | | |
|---|---|---|---|
| 2006/0172202 A1* | 8/2006 | Smith et al. | 429/332 |
| 2008/0305398 A1* | 12/2008 | Komiya | 429/246 |
| 2011/0217577 A1* | 9/2011 | Fukui et al. | 429/94 |
| 2012/0141862 A1 | 6/2012 | Schaefer et al. | |
| 2013/0143109 A1* | 6/2013 | Kim et al. | 429/178 |

FOREIGN PATENT DOCUMENTS

| | | |
|---|---|---|
| JP | 10326609 A | 12/1998 |
| JP | 2003109654 A | 4/2003 |
| JP | 2011124091 A | 6/2011 |
| KR | 1020030066959 A | 8/2003 |
| KR | 1020080009350 A | 1/2008 |
| KR | 1020120040131 A | 4/2012 |

* cited by examiner

*Primary Examiner* — Miriam Stagg
*Assistant Examiner* — Carmen Lyles-Irving
(74) *Attorney, Agent, or Firm* — Cantor Colburn LLP

(57) ABSTRACT

A stack type battery includes a stack including: a plurality of cathode sheets; a plurality of anode sheets, which are alternately disposed with the cathode sheets; and a plurality of separators, where each of the separator is disposed between a corresponding cathode sheet of the cathode sheets and a corresponding anode sheet of the anode sheets, where the stack includes first to third protrusions, the first protrusion includes a portion of the cathode sheets which does not overlap the anode sheets and the separators, and the second protrusion includes a portion of the anode sheets which does not overlap the cathode sheets and the separators.

18 Claims, 20 Drawing Sheets

STACK TYPE BATTERY

CROSS-REFERENCE TO RELATED APPLICATIONS

This application claims priority to Korean Patent Application No. 10-2012-0146627, filed on Dec. 14, 2012, and all benefits accruing therefrom under 35 U.S.C. §119, the content of which in its entirety is herein incorporated by reference.

BACKGROUND

1. Field

The disclosure relates to a battery, and more particularly, to a stack type battery.

2. Description of the Related Art

Various mobile electronic devices, such as smart phones, smart pads, electronic books, watch phones, portable/wearable medical devices, and wearable computers, as well as mobile phones, game machines, portable multimedia players ("PMP"s), and MPEG audio layer-3 ("MP3") players, for example, have been introduced due to the development of electronic technology. Batteries are typically used for driving these various mobile electronic devices. The mobile electronic devices may be driven by primary batteries, but, in most cases, secondary batteries are widely used.

Recently, mobile electronic devices with reduced size and versatile functions have been developed, and the devices have been designed to have a configuration that may increase an integration density of parts.

With respect to a battery, which is one of the core parts used for driving a mobile electronic device, when the volume of the battery is increased, the capacity of the battery may be increased. Accordingly, the volume of the battery may not be effectively reduced for compactness of the mobile electronic devices when the capacity of the battery is substantially secured for high integration of the mobile electronic device.

SUMMARY

Provided are stack type batteries able to maximize utilization of allocated space in the battery.

Additional aspects will be set forth in part in the description which follows and, in part, will be apparent from the description, or may be learned by practice of the presented embodiments.

According to an embodiment of the invention, a stack type battery includes a stack including: a plurality of cathode sheets; a plurality of anode sheets, which are alternately disposed with the cathode sheets; and a plurality of separators, where each of the separator is disposed between a corresponding cathode sheet of the cathode sheets and a corresponding anode sheet of the anode sheets, where the stack includes first to third protrusions, the first protrusion includes a portion of the cathode sheets which does not overlap the anode sheets and the separators, and the second protrusion includes a portion of the anode sheets which does not overlap the cathode sheets and the separators.

In an embodiment, the third protrusion may include a portion of the cathode sheets, a portion of the anode sheets and a portion of the separators, which overlap each other. In an embodiment, the third protrusion may include a portion of the separators which does not overlap the anode sheets and the cathode sheets.

In an embodiment, a distance between adjacent protrusions of the first to third protrusions may be in the range of about 0.001 millimeter (mm) to about 100 millimeters (mm).

In an embodiment, the stack may further include a fourth protrusion. In such an embodiment, a distance between adjacent protrusions of the first to fourth protrusions may be in the range of about 0.001 mm to about 100 mm.

In an embodiment, the fourth protrusion may include a portion of the cathode sheets, a portion of the anode sheets and a portion of the separators, which overlap each other.

In an embodiment, the fourth protrusion may extend in a same direction as an extending direction of the first to third protrusions.

In an embodiment, at least two protrusions of the first to fourth protrusions may extend in different directions from each other.

In an embodiment, the stack may further include an active material layer disposed on a portion of the cathode and anode sheets corresponding to the third protrusion.

In an embodiment, the stack may further include an active material layer disposed on a portion of the cathode and anode sheets corresponding to the fourth protrusion.

In an embodiment, an edge of the portion of the separators corresponding to the third protrusion may be inclined.

In an embodiment, an edge of the portion of the separators corresponding to the fourth protrusion may be inclined.

In an embodiment, a protrusion length of one of the first to third protrusions may be less than a protrusion length of another of first to third protrusions.

In an embodiment, protrusion lengths of two protrusions of the first to fourth protrusions may be greater than protrusion lengths of the remaining protrusions of the first to fourth protrusions.

In an embodiment, a width of one of the first to third protrusions may be different from a width of another of the first to third protrusions.

In an embodiment, a width of one of the first to fourth protrusions may be different from a width of another of the first to fourth protrusions According to embodiments, the active material layer is provided on the protrusion of the electrode sheet corresponding to the protrusion of the separator, and the capacity thereof is thereby substantially increased.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
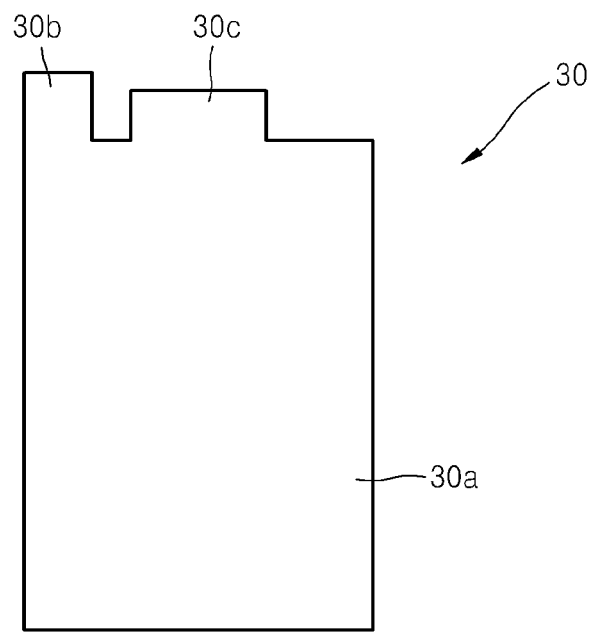
FIG. 1 is a plan view of an anode sheet of a stack type battery according to an embodiment of the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of stack type batteries will be described in detail with reference to the accompanying drawings.

FIG. 1 is a plan view of an anode sheet (e.g., a current collector) of a stack type battery according to an embodiment of the invention.

Referring to FIG. 1, an embodiment of an anode sheet (e.g., a current collector) 30 includes a main body 30a, a tab protrusion 30b extending from the main body 30a, and a sheet protrusion 30c. The tab protrusion 30b may function as an electrode tab of the anode sheet 30. In an embodiment, as shown in FIG. 1, the tab protrusion 30b may protrude further than the sheet protrusion 30c. The sheet protrusion 30c protrudes into a space between electrode tabs in a conventional stack type battery. An active material layer provided, e.g., formed, on the main body 30a may also be provided on the sheet protrusion 30c. In such an embodiment, a reaction area of the anode sheet is increased such that a capacity of the battery is increased.

Figure 2:
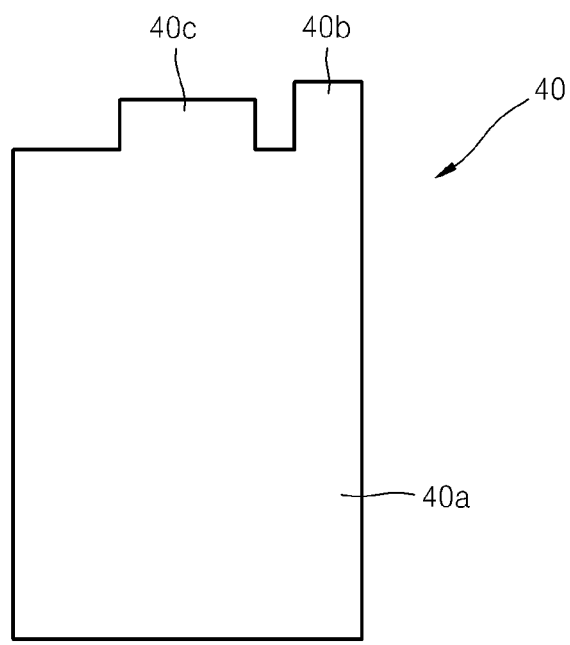
FIG. 2 is a plan view of a cathode sheet of the stack type battery according to an embodiment of the invention.

FIG. 2 is a plan view of a cathode sheet (e.g., current collector) of the stack type battery according to an embodiment of the invention.

Referring to FIG. 2, an embodiment of a cathode sheet (e.g., current collector) 40 includes a main body 40a, a tab protrusion 40b and a sheet protrusion 40c. A protrusion length (e.g., a length in a direction of protrusion) of the tab protrusion 40b is greater than a protrusion length of the sheet protrusion 40c. The tab protrusion 40b extends from the main body 40a and may function as an electrode tab of the cathode sheet 40. The sheet protrusion 40c corresponds to the sheet protrusion 30c of the anode sheet 30 in FIG. 1. An active material layer provided, e.g., formed, on the main body 40a may also be provided on the sheet protrusion 40c of the cathode sheet 40. In such an embodiment, a reaction area of the cathode sheet is increased such that the capacity of the battery is increased. The tab protrusions 30b and 40b of the anode sheet 30 and the cathode sheet 40 may not overlap each other in a stack structure of the anode sheet 30 and the cathode sheet 40.

Figure 3:
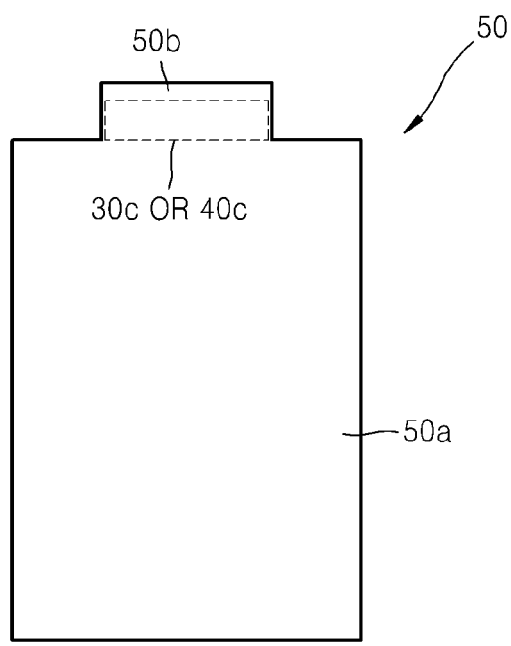
FIG. 3 is a plan view of a separator of the stack type battery according to an embodiment of the invention.

FIG. 3 is a plan view of a separator of the stack type battery according to an embodiment of the invention.

Referring to FIG. 3, an embodiment of a separator 50 includes a main body 50a and a protrusion 50b. The protrusion 50b may extend from a portion of the main body 50a. The protrusion 50b may extend in a predetermined direction of the main body 50a. In one embodiment, for example, the protrusion 50b may be disposed at a middle of a top end of the main body 50a. A protrusion length of the protrusion 50b may be greater than the protrusion lengths of the sheet protrusions 30c and 40c of the anode sheet 30 and the cathode sheet 40.

Figure 4:
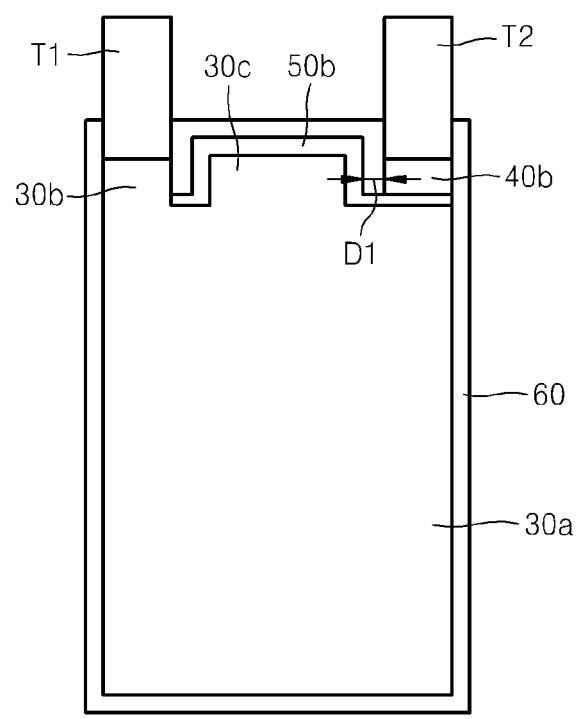
FIG. 4 is a plan view of an embodiment of a unit cell including the anode sheet, the cathode sheet and the separator of FIGS. 1 to 3, which are sequentially stacked therein.

FIG. 4 is a plan view of an embodiment of a unit cell (e.g., a unit battery cell) including the anode sheet, the cathode sheet and the separator of FIGS. 1 to 3, which are sequentially stacked therein.

Referring to FIG. 4, the sheet protrusion 30c of the anode sheet 30 has a protrusion length and a width shorter and narrower than a protrusion length and a width of the protrusion 50b of the separator 50, respectively. The protrusion lengths of the electrode tabs, e.g., the tab protrusions 30b and 40b of the anode sheet 30 and the cathode sheet 40, are greater than the protrusion length of the protrusion 50b of the separator 50. The protrusion 50b of the separator 50 is spaced apart from the tab protrusion 40b of the cathode sheet 40 by a predetermined distance D1. In one embodiment, for example, the predetermined distance D1 between the protrusion 50b of the separator 50 and the tab protrusion 40b of the cathode sheet 40 may be in a range of about 0.001 millimeter (mm) to about 100 millimeters (mm). The tab protrusion 30b of the anode sheet 30 and the tab protrusion 40b of the cathode sheet 40 are disposed on the left and right sides of the protrusion 50b of the separator 50, respectively. In an embodiment, as shown in FIG. 4, a stack type battery including the anode sheet 30, the separator 50 and the cathode sheet 40, which are sequentially stacked, is provided in a battery case 60. The tab protrusion 30b of the anode sheet 30 may be connected to the first lead tab T1, which is an anode lead tab, and the tab protrusion 40b of the cathode sheet 40 may be connected to the second lead tab T2, which is a cathode lead tab. Portions of the first and second lead tabs T1 and T2 are exposed to the outside of the battery case 60.

Figure 5:
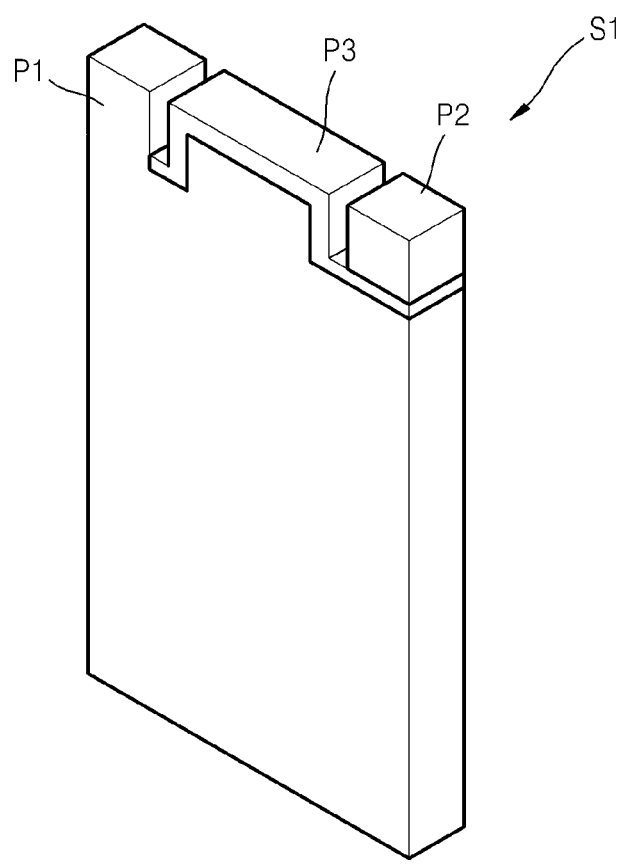
FIG. 5 is a perspective view of an embodiment of a stack provided by stacking a plurality of unit cells of FIG. 4.

FIG. 5 is a perspective view of an embodiment of a stack including a plurality of unit cells of FIG. 4.

Referring to FIG. 5, an embodiment of a stack 1 has first to third protrusions P1 to P3. The first to third protrusions P1 to P3 do not overlap one another. The first protrusion P1 includes a portion of a plurality of anode sheets 30 of the stack S1, e.g., the tab protrusions 30b of the anode sheets 30. The anode lead tab may be connected to the first protrusion P1. The second protrusion P2 includes a portion of a plurality of cathode sheets 40 of the stack S1, e.g., the tab protrusions 40b of the cathode sheets 40. The cathode lead tab may be connected to the second protrusion P2. The third protrusion P3 includes a portion of the anode sheets 30, a portion of the cathode sheets 40 and a portion of the separators 50, e.g., the sheet protrusions 30c of the anode sheets 30, the sheet protrusions 40c of the cathode sheets 40, and the protrusions 50b of the separators 50. The first and second protrusions P1 and P2 are spaced apart from the third protrusion P3 by the predetermined distance D1.

Figure 6:
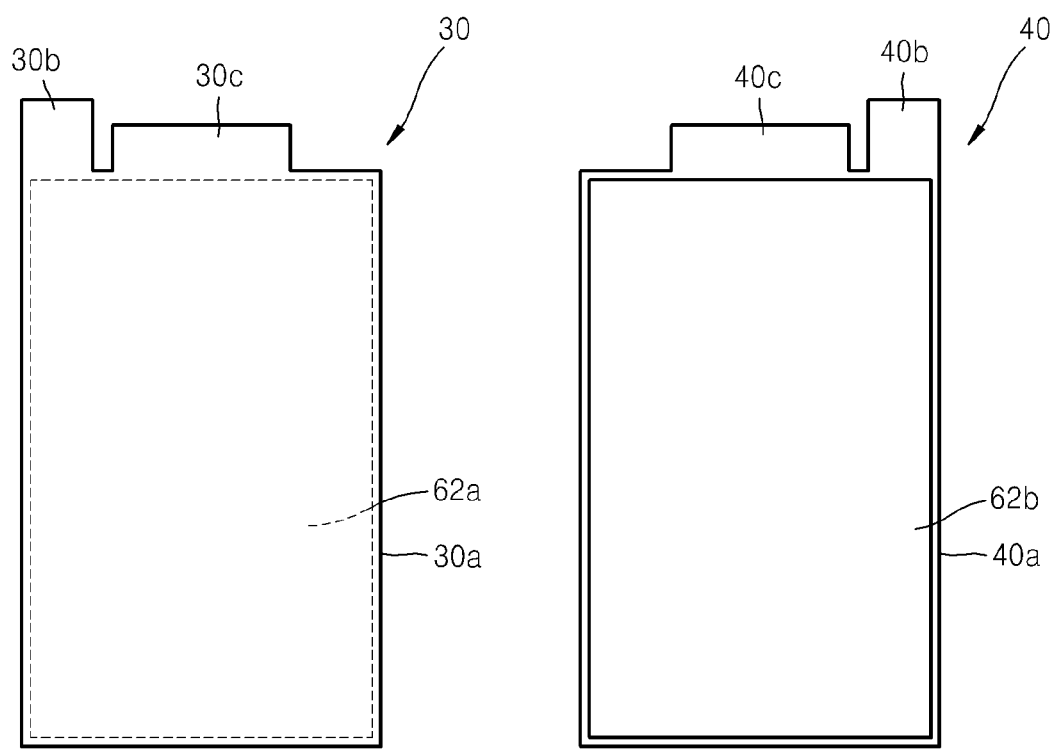
FIG. 6 is a plan view of an alternative embodiment in which active materials are formed only in main bodies in the anode and cathode sheets of FIGS. 1 and 2.

FIG. 6 is a plan view of an alternative embodiment in which active materials are formed only in main bodies in the anode and cathode sheets of FIGS. 1 and 2.

In an embodiment, as shown in FIGS. 1 to 5, active material layers may be provided on the sheet protrusions 30c and 40c of the anode and cathode sheets 30 and 40. In an alternative embodiment, as illustrated in FIG. 6, active material layers 62a and 62b may be provided only on the main bodies 30a and 40a of the anode and cathode sheets 30 and 40, and the active material layers may not exist on the sheet protrusions 30c and 40c of the anode and cathode sheets 30 and 40.

In an embodiment, the protrusion 50b of the separator 50 may functions as a unit for relatively fixing each layer of the electrode stack. In one embodiment, the protrusions 50b of the separators 50 of the stack S1 may be fixed to each other such that each layer of the electrode stack are fixed to each other. In an alternative embodiment, as illustrated in FIG. 6, where active material layers do not exist on the sheet protrusions 30c and 40c of the anode and cathode sheets 30 and 40, the sheet protrusions 30c and 40c of the anode and cathode sheets 30 and 40 may be fixed to, e.g., directly adhered to, the protrusion 50b of the separator 50. In such an embodiment, the anode and cathode sheets 30 and 40 and the separator 50 may be substantially firmly fixed to one another. In such an embodiment, the anode and cathode may be electrically insulated from each other, and a non-conductor may be used as a material for bonding the each layer of the electrode stack with the protrusion 50b of the separator 50. In one embodiment, for example, a polymer material may be used as the non-conductor.

In an embodiment, where the protrusion 50b of the separator 50 is used as a unit for fixing the each layer of the electrode stack, the stack type battery may be substantially stable. In such an embodiment, positions of the separator 50 and each electrode sheet are fixed through the protrusion 50b of the separator 50 such that the stack type battery may be used as a flexible battery with substantially stable performance even after repetitive bending.

Figure 7:
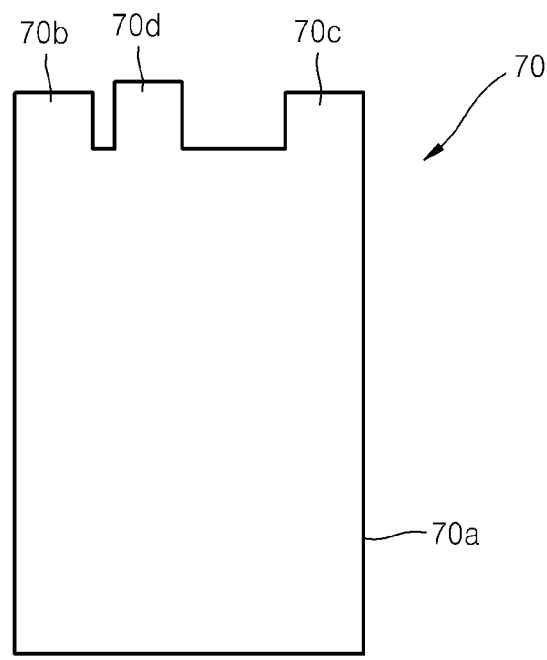
FIG. 7 is a plan view of an anode sheet of a stack type battery according to an another embodiment of the invention.

FIG. 7 is a plan view of an anode sheet of a stack type battery according to another embodiment of the invention.

Referring to FIG. 7, an embodiment of an anode sheet 70 includes a main body 70a, two sheet protrusions, e.g., a first sheet protrusion 70b and a second sheet protrusion 70c, and a tab protrusion 70d. The first and second sheet protrusions 70b and 70c and the tab protrusion 70d extend from a side of the main body 70a. The tab protrusion 70d is disposed between the first and second sheet protrusions 70b and 70c. In an embodiment, the first and second sheet protrusions 70b and 70c are disposed on the left and right sides of the tab protrusion 70d, respectively, and protrusion lengths of the first and second sheet protrusions 70b and 70c may be substantially the same as each other. In an alternative embodiment, the protrusion lengths of the first and second sheet protrusions 70b and 70c may be different from each other. The tab protrusion 70d is disposed closer to the first sheet protrusion 70b than the second sheet protrusion 70c. A protrusion length of the tab protrusion 70d is greater than the protrusion length of the first and second sheet protrusions 70b and 70c.

Figure 8:
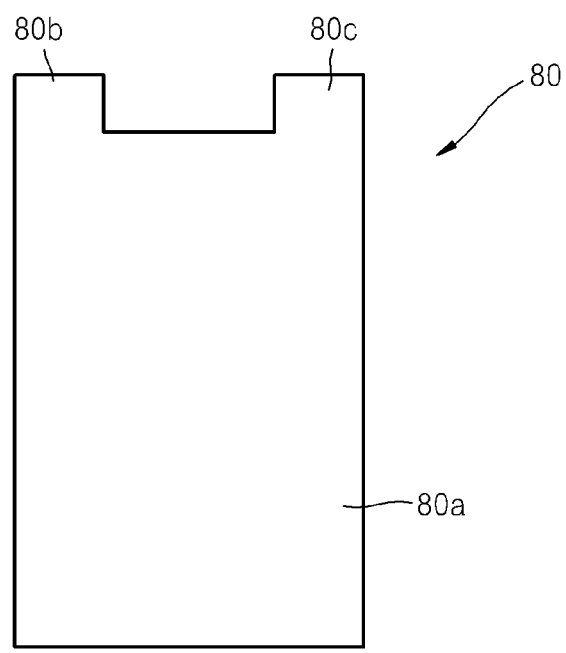
FIG. 8 is a plan view of a separator of a stack type battery according to another embodiment of the invention.

FIG. 8 is a plan view of a separator of a stack type battery according to another embodiment of the invention.

Referring to FIG. 8, a separator 80 includes a main body 80a and two protrusions, e.g., a first protrusion 80b and a second protrusion 80c. The first and second protrusions 80b and 80c are disposed on the left and right sides of the main body 80a, respectively.

Figure 9:
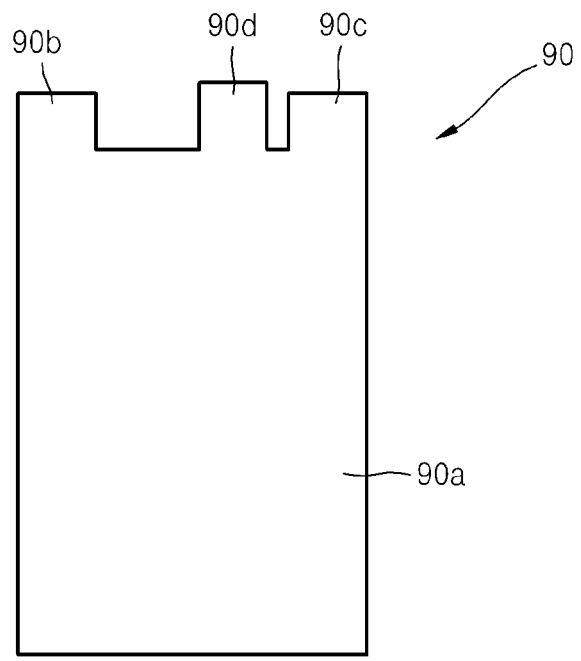
FIG. 9 is a plan view of a cathode sheet of a stack type battery according to another embodiment of the invention.

FIG. 9 is a plan view of a cathode sheet of a stack type battery according to another embodiment of the invention.

Referring to FIG. 9, an embodiment of a cathode sheet 90 includes a main body 90a, two sheet protrusions, e.g., a first sheet protrusion 90b and a second sheet protrusion 90c, and a tab protrusion 90d. The first and second sheet protrusions 90b and 90c and the tab protrusion 90d extend from the main body 90a in a same direction, e.g., a first direction. In an embodiment, the first and second protrusions 80b and 80c of the separator 80 of FIG. 8 extend from the main body 80a in the same direction, e.g., the first direction, and the first and second sheet protrusions 70b and 70c and the tab protrusion 70d of the anode sheet 70 of FIG. 7 extend from in the same direction, e.g., the first direction.

The first and second sheet protrusions 90b and 90c of the cathode sheet 90 in FIG. 9 are disposed on the left and right sides of the main body 90a, respectively. The tab protrusion 90d is disposed between the first and second sheet protrusions 90b and 90c, and may function as a tab electrode. A protrusion length of the tab protrusion 90d is greater than protrusion lengths of the first and second sheet protrusions 90b and 90c. The tab protrusion 90d is disposed closer to the second sheet protrusion 90c than the first sheet protrusion 90b.

Figure 10:
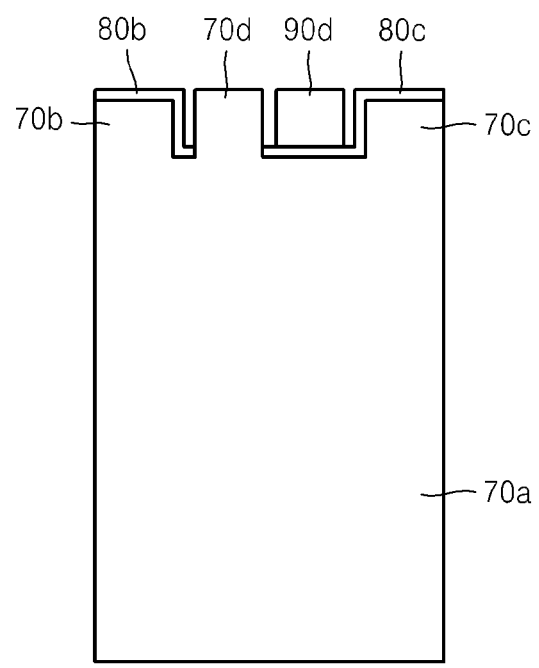
FIG. 10 is a plan view of an another embodiment of a unit cell including the cathode sheet of FIG. 9, the separator of FIG. 8, and the anode sheet of FIG. 7, which are sequentially stacked therein.

FIG. 10 is a plan view of an embodiment of a unit cell including the cathode sheet of FIG. 9, the separator of FIG. 8 and the anode sheet of FIG. 7, which are sequentially stacked therein.

Referring to FIG. 10, in an embodiment of the unit cell, the tab protrusion 70d of the anode sheet 70 and the tab protrusion 90d of the cathode sheet 90 do not overlap and are spaced apart from each other. In such an embodiment, the first and second protrusions 80b and 80c of the separator 80, which are adjacent to the tab protrusion 70d of the anode sheet 70 and the tap protrusion 90d of the cathode sheet 90, respectively, are spaced apart from each other. In an embodiment, each of a distance between the first protrusion 80b of the separator and the tab protrusion 70d of the anode sheet 70 and a distance between the second protrusion 80c of the separator 80 and the tab protrusion 90d of the cathode sheet 90 may be in a range of about 0.001 mm to about 100 mm, for example. The tab protrusions 70d and 90d of the anode sheet 70 and the cathode sheet 90 are disposed between the first and second protrusions 80b and 80c of the separator 80. The protrusion lengths of the tab protrusions 70d and 90d of the anode sheet 70 and the cathode sheet 90 may be greater than the protrusion lengths of the first and second protrusions 80b and 80c of the separator 80.

Figure 11:
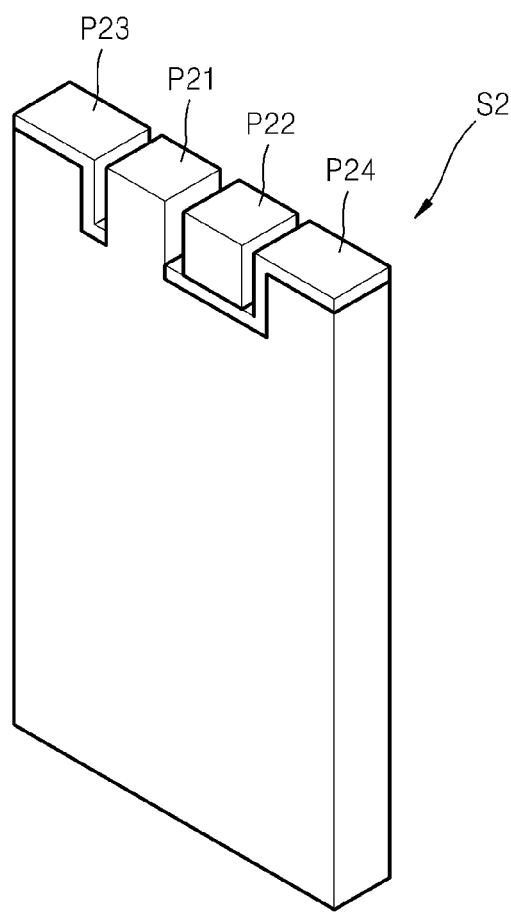
FIG. 11 is a perspective view of an embodiment of a stack provided by stacking a plurality of unit cells of FIG. 10.

FIG. 11 is a perspective view of an embodiment of a stack provided by stacking a plurality of unit cells of FIG. 10.

Referring to FIG. 11, an embodiment of the stack S2 includes first to fourth protrusions P21 to P24. The first to fourth protrusions P21 to P24 are spaced apart from each other and do not overlap one other. The first to fourth protrusions P21 to P24 are formed in the same direction. The first protrusion P21 may be an anode electrode tab. The first protrusion P21 may include the plurality of anode sheets 70, e.g., the tab protrusions 70d of the anode sheets 70. The second protrusion P22 may be a cathode electrode tab. The second protrusion P22 may include the plurality of cathode sheets 90, e.g., the tab protrusions 90d of the cathode sheets 90. The third protrusion P23 includes the anode sheets 70, the cathode sheets 90 and the separators 80, e.g., the first sheet protrusions 70b of the anode sheets 70, the first sheet protrusions 90b of the cathode sheets 90, and the first protrusions 80b of the separators 80. The fourth protrusion P24 includes the anode sheets 70, the cathode sheets 90 and the separators 80, e.g., the second sheet protrusions 70c of the anode sheets 70, the second sheet protrusions 90c of the cathode sheets 90, and the second protrusions 80c of the separators 80.

Figure 12:
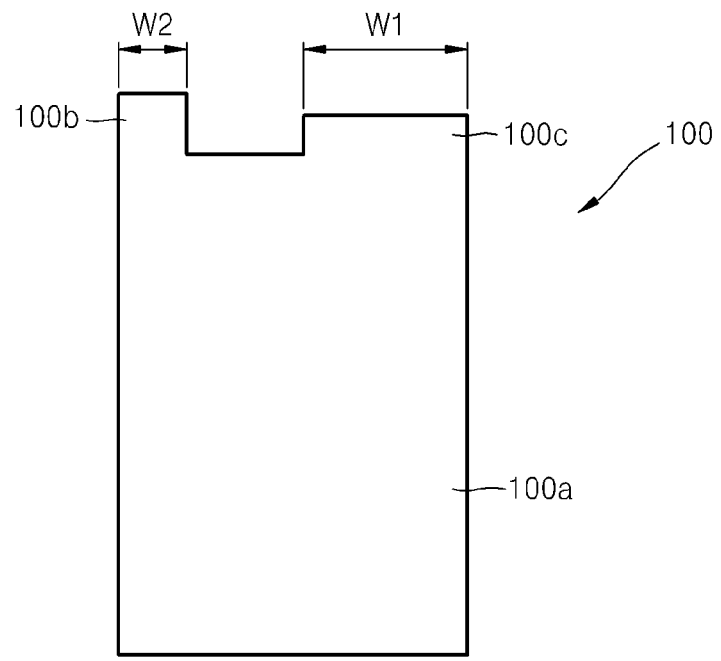
FIG. 12 is a plan view of an anode sheet of a stack type battery according to another embodiment of the invention.

FIG. 12 is a plan view of an anode sheet of a stack type battery according to another embodiment of the invention.

Referring to FIG. 12, an embodiment of an anode sheet 100 includes a main body 100a, a tab protrusion 100b and a sheet protrusion 100c. The tab protrusion 100b and the sheet protrusion 100c may extend from the main body 100a. The tab protrusion 100b may function as an electrode tab. A protrusion length of the tab protrusion 100b is greater than a protrusion length of the sheet protrusion 100c. A width W1 of the sheet protrusion 100c is greater than a width W2 of the tab protrusion 100b.

Figure 13:
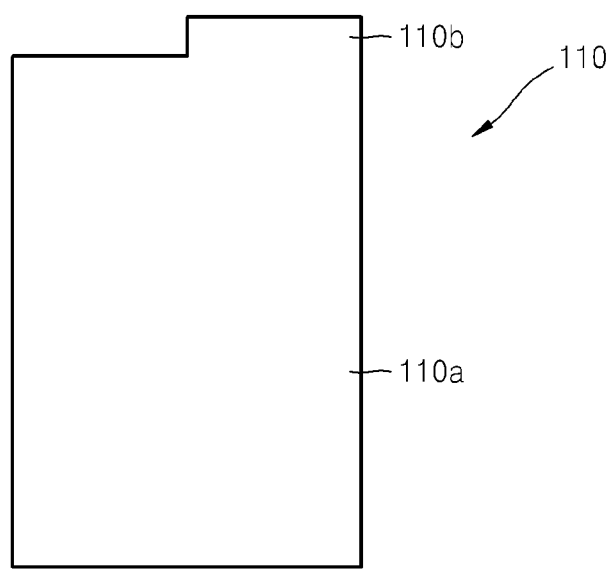
FIG. 13 is a plan view of a separator of a stack type battery according to another embodiment of the invention.

FIG. 13 is a plan view of a separator of a stack type battery according to another embodiment of the invention.

Referring to FIG. 13, an embodiment of a separator 110 includes a main body 110a and a protrusion 110b. The protrusion 110b extends from a portion of the main body 110a. A position of the protrusion 110b of the separator 110 corresponds to the sheet protrusion 100c of the anode sheet 100 in FIG. 12. A width of the protrusion 110b of the separator 110 may be greater than a width W1 of the sheet protrusion 100c of the anode sheet 100. A protrusion length of the protrusion 110b of the separator 110 may be substantially the same as or different from the protrusion length of the sheet protrusion 100c of the anode sheet 100.

Figure 14:
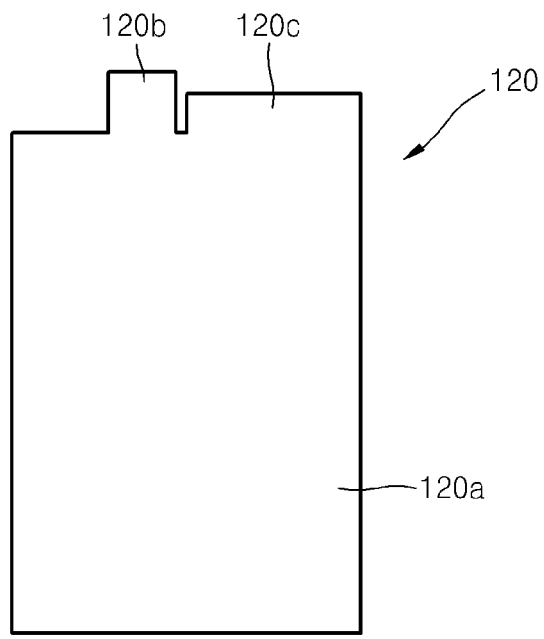
FIG. 14 is a plan view of a cathode sheet of a stack type battery according to another embodiment of the invention.

FIG. 14 is a plan view of a cathode sheet of a stack type battery according to another embodiment of the invention.

Referring to FIG. 14, an embodiment of a cathode sheet 120 includes a main body 120a, a tab protrusion 120b and a sheet protrusion 120c. The tab protrusion 120b and the sheet protrusion 120c of the cathode sheet 120 extend from the main body 120a and protrude in substantially the same direction as the tab protrusion 100b and the sheet protrusion 100c of the anode sheet 100. The tab protrusion 120b, the sheet protrusion 120c and the main body 120a may be integrally formed as a single unitary and indivisible unit. A protrusion length of the tab protrusion 120b of the cathode sheet 120 is greater than a protrusion length of the sheet protrusion 120c of the cathode sheet 120. The tab protrusion 120b of the cathode sheet 120 may function as an electrode tab. The sheet protrusion 120c of the cathode sheet 120 may be disposed opposite to e.g., facing the sheet protrusion 100c of the anode sheet 100, and the protrusion 110b of the separator is disposed between the sheet protrusion 120c of the cathode sheet 120 and the sheet protrusion 100c of the anode sheet 100. In such an embodiment, a width of the sheet protrusion 120c of the cathode sheet 120 may be substantially the same as a width of the sheet protrusion 100c of the anode sheet 100. In such an embodiment, a width of the tab protrusion 120b of the cathode sheet 120 may be the same as a width of the tab protrusion 100b of the anode sheet 100.

Figure 15:
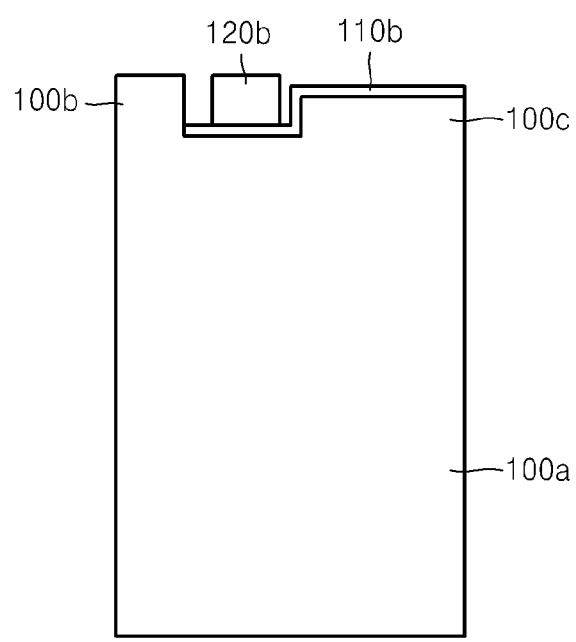
FIG. 15 is a plan view of another alternative embodiment of a unit cell including the cathode sheet of FIG. 14, the separator of FIG. 13 and the anode sheet of FIG. 12, which are sequentially stacked therein.

FIG. 15 is a plan view of an embodiment of a unit cell including the cathode sheet 120 of FIG. 14, the separator 110 of FIG. 13 and the anode sheet 100 of FIG. 12, which are sequentially stacked therein.

Referring to FIG. 15, in an embodiment of the unit cell, the tab protrusion 100b of the anode sheet 100 and the tab protrusion 120b of the cathode sheet 120 are spaced apart from each other. The protrusion lengths of the tab protrusion 100b of the anode sheet 100 and the tab protrusion 120b of the cathode sheet 120 are substantially the same, but not being limited thereto. In an alternative embodiment, the protrusion lengths of the tab protrusion 100b of the anode sheet 100 and the tab protrusion 120b of the cathode sheet 120 may be different from each other. The protrusion 110b of the separator 110 is closer to the tab protrusion 120b of the cathode sheet 120 than the tab protrusion 100b of the anode sheet 100. In an embodiment, the protrusion lengths of the tab protrusion 100b of the anode sheet 100 and the tab protrusion 120b of the cathode sheet 120 are greater than a protrusion length of the protrusion 110b of the separator 110. In an embodiment, the protrusions of the anode sheet 100, the separator 110 and the cathode sheet 120 protrude substantially in a same direction.

Figure 16:
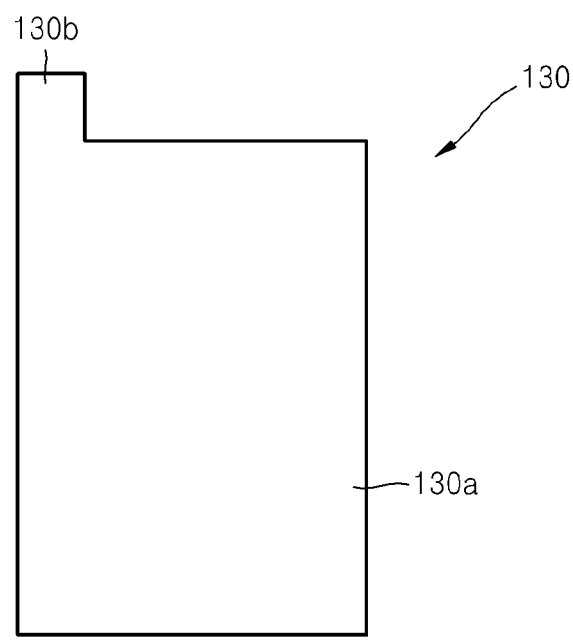
FIG. 16 is a plan view of an anode sheet of a stack type battery according to another embodiment of the invention.

FIG. 16 is a plan view of an anode sheet of a stack type battery according to another embodiment of the invention.

Referring to FIG. 16, an embodiment of an anode sheet 130 includes a main body 130a and a tab protrusion 130b. In such an embodiment, the anode sheet 130 does not include a sheet protrusion, and the tab protrusion 130b may function as an electrode tab.

Figure 17:
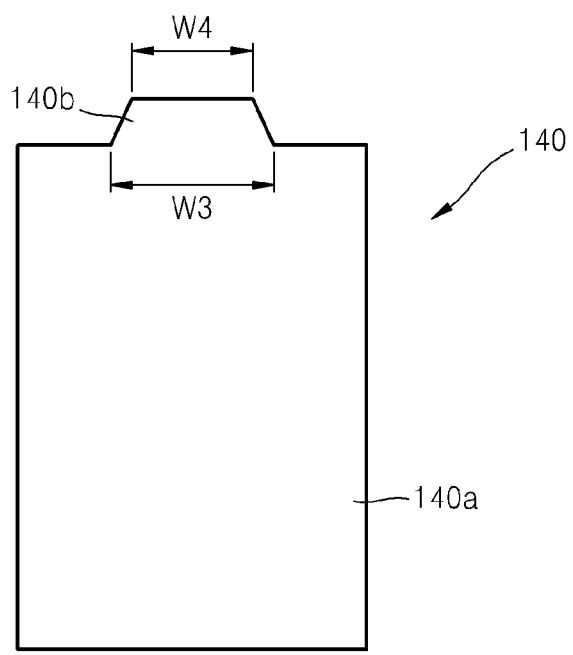
FIG. 17 is a plan view of a separator of a stack type battery, according to another embodiment of the invention.

FIG. 17 is a plan view of a separator of a stack type battery according to another embodiment of the invention.

Referring to FIG. 17, an embodiment of a separator 140 includes a main body 140a and a protrusion 140b. In such an embodiment, a position and a direction of the protrusion 140b of the separator 140 may be substantially the same as a position and a direction of the embodiment of the protrusion 50b of the separator 50 illustrated in FIG. 3. In an embodiment, as shown in FIG. 17, a portion of an edge of the protrusion 140b is inclined. In one embodiment, for example, the protrusion 140b of the separator 140 has a shape of trapezoid. In an embodiment, a side edge, which is the edge between a beginning portion (e.g., a portion in contact with the main body 140a) and an ending portion (e.g., a portion opposite to the main body 140a) of the protrusion 140b is inclined inwardly. In such an embodiment, a width W3 of the beginning portion of the protrusion 140b is greater than a width W4 of the ending portion.

Figure 18:
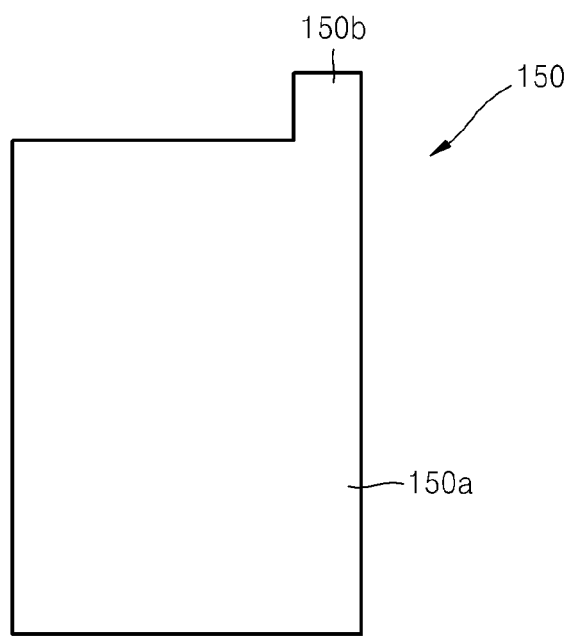
FIG. 18 is a plan view of a cathode sheet of a stack type battery according to another embodiment of the invention.

FIG. 18 is a plan view of a cathode sheet of a stack type battery according to another embodiment of the invention.

Referring to FIG. 18, an embodiment of a cathode sheet 150 includes a main body 150a and a tab protrusion 150b. The tab protrusion 150b may function as an electrode tab. The cathode sheet 150, similar to the anode sheet 130 shown in FIG. 16, does not include a sheet protrusion.

Figure 19:
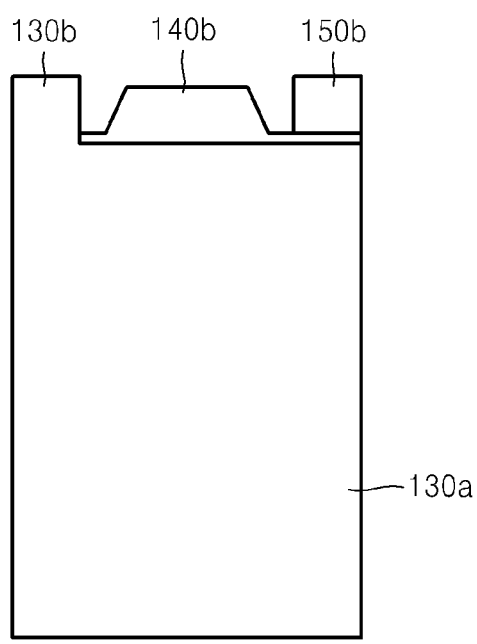
FIG. 19 is a plan view of an embodiment of a unit cell including the cathode sheet of FIG. 18, the separator of FIG. 17 and the anode sheet of FIG. 16, which are sequentially stacked therein.

FIG. 19 is a plan view of an embodiment of a unit cell including the cathode sheet 150 of FIG. 18, the separator 140 of FIG. 17 and the anode sheet 130 of FIG. 16.

Referring to FIG. 19, the tab protrusion 130b of the anode sheet 130 and the tab protrusion 150b of the cathode sheet 150 are respectively provided on the left and right sides of the protrusion 140b of the separator 140. Protrusion lengths of the tab protrusions 130b and 150b of the anode sheet 130 and the cathode sheet 150 are greater than a protrusion length of the protrusion 140b of the separator 140. The tab protrusions 130b and 150b of the anode sheet 130 and the cathode sheet 150 and the protrusion 140b of the separator 140 extend in a same direction.

Figure 20:
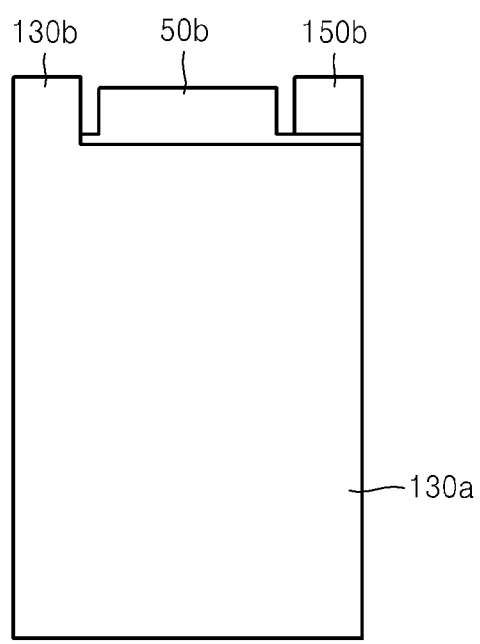
FIG. 20 is a plan view of an alternative embodiment of the unit cell including the cathode sheet 150 of FIG. 18, the separator of FIG. 3 and the anode sheet 130 of FIG. 16.

FIG. 20 illustrates an alternative embodiment of the unit cell including the cathode sheet 150 of FIG. 18, the separator 50 of FIG. 3 and the anode sheet 130 of FIG. 16.

Figure 21:
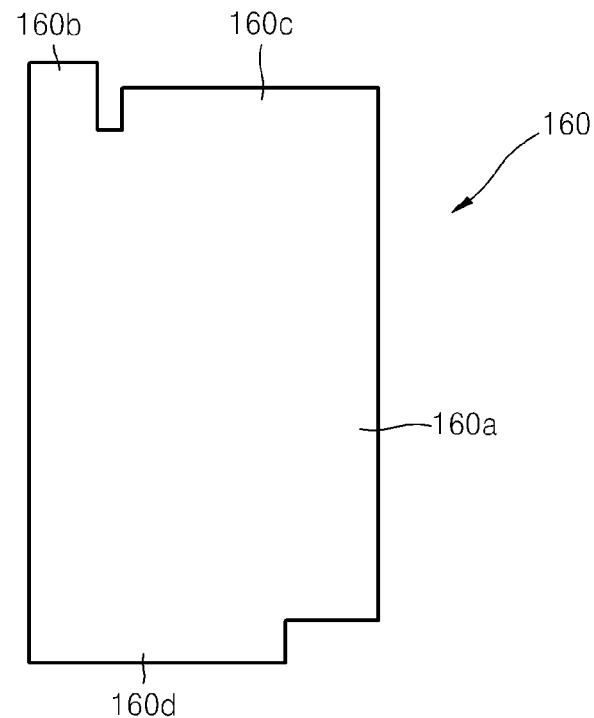
FIG. 21 is a plan view of an anode sheet of a stack type battery according to another embodiment of the invention.

FIG. 21 is a plan view of an anode sheet of a stack type battery according to another embodiment of the invention.

Referring to FIG. 21, an embodiment of an anode sheet 160 includes a main body 160a, a tab protrusion 160b which extends in a first direction from the main body 160a, a first sheet protrusion 160c which extends in the first direction from the main body 160a, and a second sheet protrusion 160d which extends in a second direction from the main body 160a. The first and second directions are different from each other. In one embodiment, for example, the first and second directions may be opposite directions. Referring to FIG. 21, the tab protrusion 160b and the first sheet protrusion 160c protrude upwardly from the main body 160a, and the second sheet protrusion 160d protrudes downwardly from the main body 160a. The tab protrusion 160b and the first and second sheet protrusions 160c and 160d extend from the main body 160a. The main body 160a, the tab protrusion 160b, and the first and second sheet protrusions 160c and 160d may be integrally formed as a single unitary and indivisible unit. A protrusion length of the tab protrusion 160b is greater than protrusion lengths of the first and second sheet protrusions 160c and 160d. The first sheet protrusion 160c is disposed on the right side of the main body 160a, and the second sheet protrusion 160d is disposed on the left side of the main body 160a. The tab protrusion 160b is disposed spaced apart from the first sheet protrusion 160c on the left side of the main body 160a.

Figure 22:
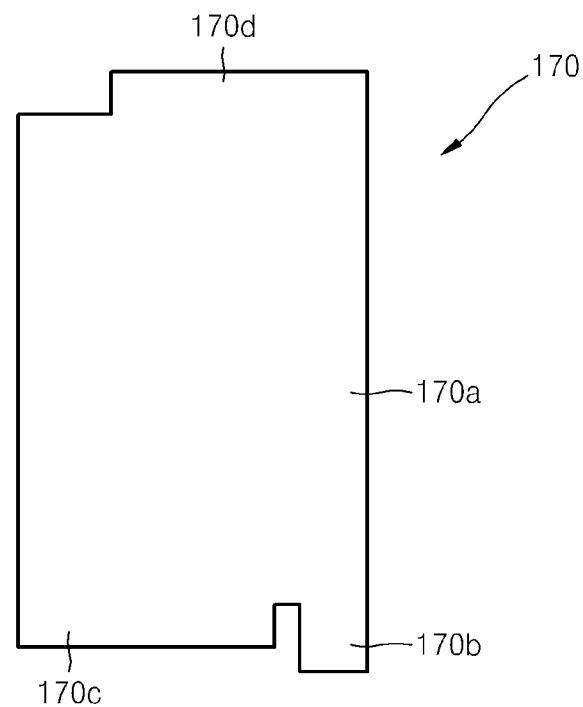
FIG. 22 is a plan view of a cathode sheet of a stack type battery according to another embodiment of the invention.

FIG. 22 is a plan view of a cathode sheet of a stack type battery according to another embodiment of the invention.

Referring to FIG. 22, an embodiment of a cathode sheet 170 includes a main body 170a, a tab protrusion 170b, and first and second sheet protrusions 170c and 170d. The tab protrusion 170b and the first sheet protrusion 170c protrude in a first direction, and the second protrusion 170d protrudes in a second direction. The first and second directions are directions from each other. In one embodiment, for example, the first and second directions may be opposite directions. The tab protrusion 170b and the first sheet protrusion 170c are included in one side of the main body 170a and the second sheet protrusion 170d is included in another side of the main body 170a. The main body 170a, the tab protrusion 170b, and the first and second sheet protrusions 170c and 170d may be integrally formed as a single unitary and indivisible unit. The tab protrusion 170b may function as an electrode tab. A protrusion length of the tab protrusion 170b is greater than protrusion lengths of the first and second sheet protrusions 170c and 170d. The protrusion lengths of the first and second sheet protrusions 170c and 170d may be substantially the same as or different from each other. Referring to FIG. 22, the tab protrusion 170b and the first sheet protrusion 170c are disposed at a bottom end of the main body 170a and the second sheet protrusion 170d is disposed at a top end of the main body 170a. The tab protrusion 170b is disposed spaced apart from the first sheet protrusion 170c on the right side of the main body 170a. The first sheet protrusion 170c is disposed on the left side of the main body 170a, and the second sheet protrusion 170d is disposed on the right side of the main body 170a. Widths of the first and second sheet protrusions 170c and 170d may be substantially the same, but not being limited thereto. In an alternative embodiment, the widths of the first and second sheet protrusions 170c and 170d may be different from each other. The widths of the first and second sheet protrusions 170c and 170d may be greater than a width of the tab protrusion 170b. In an embodiment, the first and second sheet protrusions 170c and 170d of the cathode sheet 170 may correspond to the first and second sheet protrusions 160c and 160d of the anode sheet 160 in FIG. 21. In such an embodiment, the sheet protrusions 160c, 160d, 170c and 170d of the anode sheet 160 and the cathode sheet 170 may face one another, and protrusions of a separator may be disposed therebetween.

Figure 23:
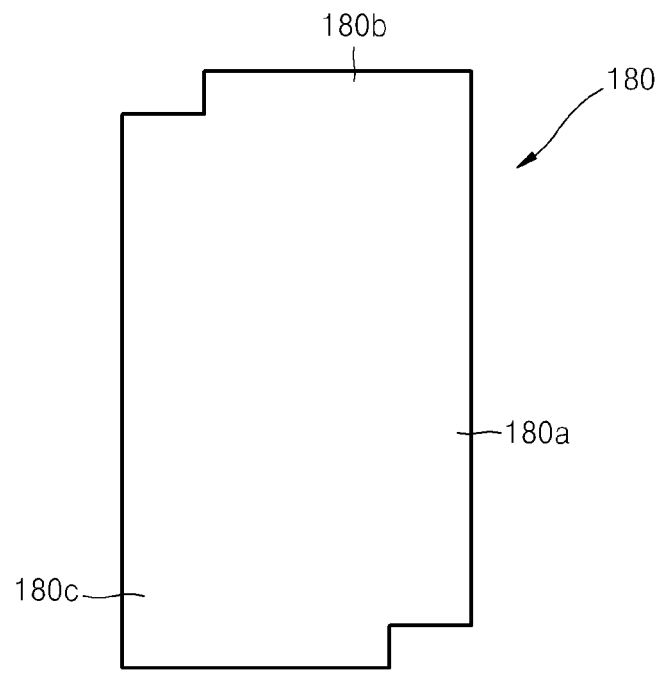
FIG. 23 is a plan view of a separator of a stack type battery according to another embodiment of the invention.

FIG. 23 is a plan view of a separator of a stack type battery according to another embodiment of the invention.

Referring to FIG. 23, an embodiment of a separator 180 includes a main body 180a and two protrusions, e.g., a top protrusion 180b and a bottom protrusion 180c. The main body 180a and the two protrusions 180b and 180c may be integrally formed as a single unitary and indivisible unit. One of the two protrusions 180b and 180c may be disposed in one side of the main body 180a and the other one of the two protrusions 180b and 180c may be disposed in another side of the main body 180a. In one embodiment, for example, referring to FIG. 23, the top protrusion 180b is disposed at a top end of the main body 180a and the bottom protrusion 180c is disposed at a bottom end of the main body 180a. Protrusion directions of the top and bottom protrusions 180b and 180c may be different from each other, for example, opposite to each other. Widths of the top and bottom protrusions 180b and 180c may be substantially the same. In an embodiment, as shown in FIG. 23, the top protrusion 180b and the bottom protrusion 180c are disposed on the right and left sides of the main body 180a, respectively.

The top protrusion 180b may correspond to the first sheet protrusion 160c of the anode sheet 160 in FIG. 21 and the second sheet protrusion 170d of the cathode sheet 170 in FIG. 22. The first sheet protrusion 160c and the second sheet protrusion 170d may be stacked to face each other with the top protrusion 180b of the separator 180 disposed therebetween.

The bottom protrusion 180c may correspond to the second sheet protrusion 160d of the anode sheet 160 in FIG. 21 and the first sheet protrusion 170c of the cathode sheet 170 in FIG. 22. The second sheet protrusion 160d and the first sheet protrusion 170c may be disposed opposite to each other with the bottom protrusion 180c of the separator 180 disposed therebetween.

Figure 24:
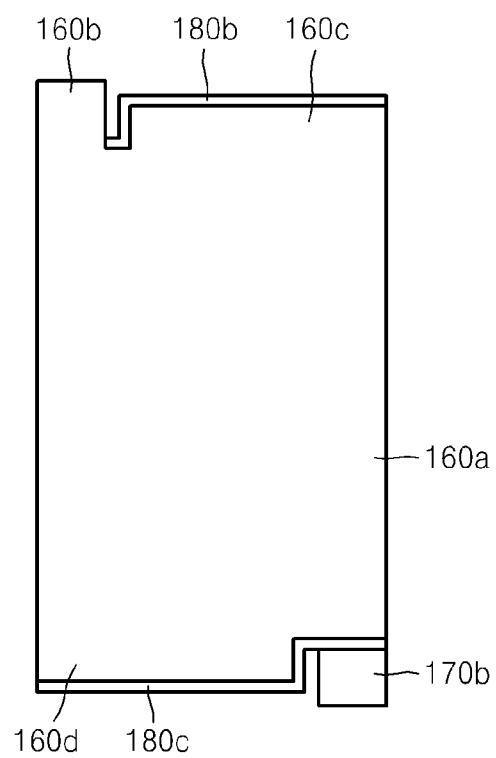
FIG. 24 is a plan view of an embodiment of a unit cell including the cathode sheet of FIG. 22, the separator of FIG. 23 and the anode sheet of FIG. 21, which are sequentially stacked therein.

FIG. 24 is a plan view of an embodiment of a unit cell including the cathode sheet 170 of FIG. 22, the separator 180 of FIG. 23, and the anode sheet 160 of FIG. 21.

Referring to FIG. 24, in an embodiment, a width of the top protrusion 180b of the separator 180 is greater than widths of the first sheet protrusion 160c of the anode sheet 160 and the second sheet protrusion 170d of the cathode sheet 170. In such an embodiment, a width of the bottom protrusion 180c of the separator 180 is greater than widths of the second sheet protrusion 160d of the anode sheet 160 and the first sheet protrusion 170c of the cathode sheet 170. In such an embodiment, the tab protrusion 160b of the anode sheet 160 and the tab protrusion 170b of the cathode sheet 170 protrude in directions different from each other, for example, opposite directions. Referring to FIG. 24, the tab protrusion 160b of the anode sheet 160 is disposed on the top end, and the tab protrusion 170b of the cathode sheet 170 is disposed on the bottom end. The tab protrusion 160b of the anode sheet 160 is adjacent to the top protrusion 180b of the separator 180. The tab protrusion 170b of the cathode sheet 170 is adjacent to the bottom protrusion 180c of the separator 180.

Figure 25:
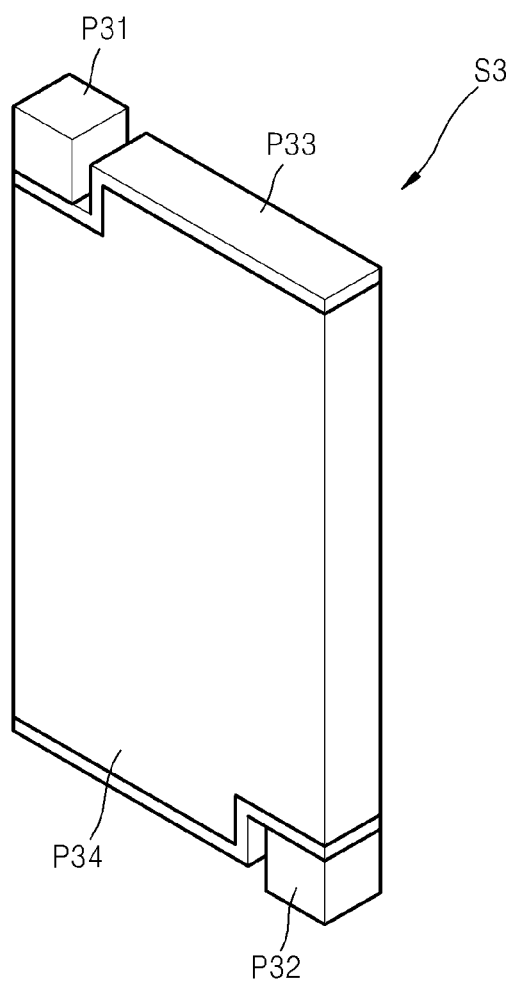
FIG. 25 is a perspective view of an embodiment of a stack provided by stacking a plurality of unit cells of FIG. 24.

FIG. 25 illustrates an embodiment of a stack including a plurality of unit cells of FIG. 24.

Referring to FIG. 25, an embodiment of the stack S3 includes first to fourth protrusions P31 to P34. The first to fourth protrusions P31 to P34 do not overlap one another. The first protrusion P31 may include a portion of the plurality of anode sheets 160, e.g., the tab protrusions 160b of the anode sheets 160. The second protrusion P32 may include a portion of the plurality of cathode sheets 170, e.g., the tab protrusions 170b of the cathode sheets 170. The first and second protrusions P31 and P32 are disposed on different sides to each other and extend in opposite directions. The first and third protrusions P31 and P33 are disposed on the same side and extend in a same direction. A protrusion length of the first protrusion P31 may be greater than a protrusion length of the third protrusion P33. The second and fourth protrusions P32 and P34 extend in a same direction on different sides from the first and third protrusions P31 and P33. In one embodiment, for example, a protrusion length of the second protrusion P32 may be greater than a protrusion length of the fourth protrusion P34. The third and fourth protrusions P33 and P34 may include a portion of the cathode sheets 170, a portion of the anode sheets 160 and a portion of the separators 180. In one embodiment, for example, the third protrusion P33 may include the first sheet protrusions 160c of the anode sheets 160, the first sheet protrusions 170c of the cathode sheets 170, and the protrusions 180b of the separators 180. In one embodiment, for example, the fourth protrusion P34 may include the second sheet protrusions 160d of the anode sheets 160, the second sheet protrusions 170d of the cathode sheets 170 and the protrusions 180c of the separators 180. In an embodiment, a distance between the first protrusion P31 and the third protrusion P33 and a distance between the second protrusion P32 and the fourth protrusion P34 may be substantially the same as the distance between the second and third protrusions P2 and P3 in FIG. 5, but not being limited thereto. In an alternative embodiment, the distance between the first protrusion P31 and the third protrusion P33 and a distance between the second protrusion P32 and the fourth protrusion P34 may be different from the distance between the second and third protrusions P2 and P3 in FIG. 5. In such an embodiment, the anode lead tab T1 and the cathode lead tab T2 illustrated in FIG. 4 may be connected to the first and second protrusions P31 and P32 of the stack S3, respectively.

Figure 26:
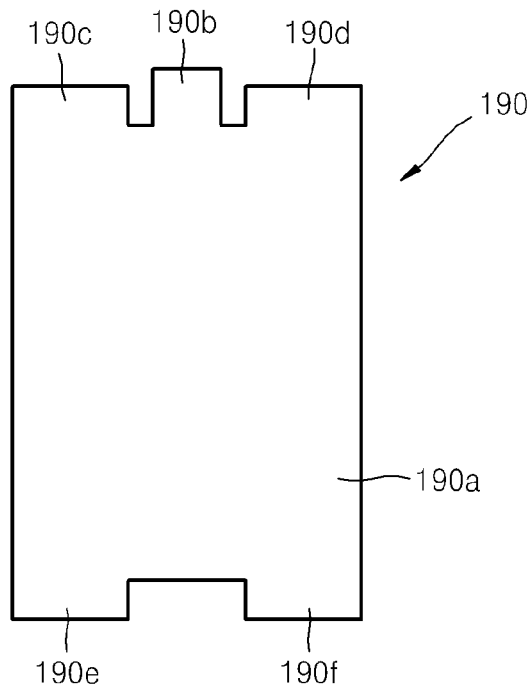
FIG. 26 is a plan view of an anode sheet of a stack type battery according to another embodiment of the invention.

FIG. 26 is a plan view of an anode sheet of a stack type battery according to another embodiment of the invention.

Referring to FIG. 26, an embodiment of an anode sheet 190 includes a main body 190a, a tab protrusion 190b and a plurality of sheet protrusions, e.g., a first sheet protrusion 190c, a second sheet protrusion 190d, a third sheet protrusion 190e and a fourth sheet protrusion 190f. The tab protrusion 190b and the first and second sheet protrusions 190c and 190d are disposed in one side (e.g., a first side) of the main body 190a, and the third and fourth sheet protrusions 190e and 190f are provided on another side (e.g., a second side opposite to the first side) of the main body 190a. In one embodiment, for example, the tab protrusion 190b and the first and second sheet protrusions 190c and 190d are disposed on a top end of the main body 190a, and the third and fourth sheet protrusions 190e and 190f are disposed on a bottom end of the main body 190a. The tab protrusion 190b may function as an electrode tab. A protrusion length of the tab protrusion 190b is greater than protrusion lengths of the first to fourth sheet protrusions 190c to 190f. In such an embodiment, the protrusion lengths of the first to fourth sheet protrusions 190c to 190f may be substantially the same as each other, but not being limited thereto. In an alternative embodiment, the protrusion lengths of the first to fourth sheet protrusions 190c to 190f may be different from each other. A width of the tab protrusion 190b may be less than widths of the first to fourth sheet protrusions 190c to 190f. The main body 190a, the tab protrusion 190b, and the first to fourth sheet protrusions 190c to 190f may be integrally formed as a single unitary and indivisible unit. In an embodiment, as shown in FIG. 26, the tab protrusion 190b may be disposed between the first and second sheet protrusions 190c and 190d. In an alternative embodiment, the tab protrusion 190b may be disposed between the third and fourth sheet protrusions 190e and 190f. The first and second sheet protrusions 190c and 190d may be substantially symmetrical to the third and fourth sheet protrusions 190e and 190f, respectively, with respect to an imaginary central horizontal line of the main body 190a of the anode sheet 190. Also, the first and third protrusions 190c and 190e are substantially symmetrical to the second and fourth sheet protrusions 190d and 190f, respectively, with respect to an imaginary central vertical line of the main body 190a of the anode sheet 190.

Figure 27:
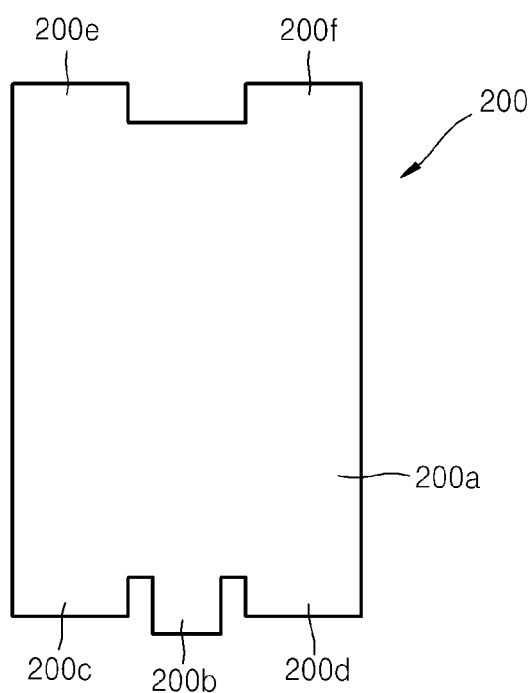
FIG. 27 is a plan view of a cathode sheet of a stack type battery according to another embodiment of the invention.

FIG. 27 is a plan view of a cathode sheet of a stack type battery according to another embodiment of the invention.

Referring to FIG. 27, an embodiment of a cathode sheet 200 includes a main body 200a, a tab protrusion 200b, and a plurality of sheet protrusions, e.g., first to fourth sheet protrusions 200c, 200d, 200e and 200f. The main body 200a, the tab protrusion 200b, and the first to fourth sheet protrusions 200c, 200d, 200e and 200f may be integrally formed as a single unitary and indivisible unit. The tab protrusion 200b may function as an electrode tab. The tab protrusion 200b and the first and second sheet protrusions 200c and 200d extend in a first direction from the main body 200a, and the third and fourth sheet protrusions 200e and 200f extend in a second direction from the main body 200a. The first and second directions are different from each other, e.g., the first and second directions may be opposite to each other. In an embodiment, as shown in FIG. 27, the first direction may be a direction from a top end toward a bottom end of the main body 200a, and the second direction may be a direction from the bottom end toward the top end of the main body 200a. The tab protrusion 200b is disposed between the first and second sheet protrusions 200c and 200d. A protrusion length of the tab protrusion 200b is greater than protrusion lengths of the first to fourth sheet protrusions 200c to 200f. All the protrusion lengths of the first to fourth sheet protrusions 200c to 200f may be substantially the same as each other, but not being limited thereto. In an alternative embodiment, some of the protrusion lengths of the first to fourth sheet protrusions 200c to 200f may be different from one another. In an embodiment of a stack, where the anode sheet 190 of FIG. 26 and the cathode sheet 200 of FIG. 27 are stacked, the tab protrusion 200b does not overlap the tab protrusion 190b of the anode sheet 190, and the tab protrusion 200b may be disposed between the third and fourth sheet protrusions 190e and 190f of the anode sheet 190.

The first and second sheet protrusions 200c and 200d are substantially symmetrical to the third and fourth sheet protrusions 200e and 200f, respectively, with respect to an imaginary central horizontal line of the main body 200a of the cathode sheet 200. Also, the first and third sheet protrusions 200c and 200e are substantially symmetrical to the second and fourth sheet protrusions 200d and 200f, respectively, with respect to an imaginary central vertical line of the main body 200a of the cathode sheet 200. The first and second sheet protrusions 200c and 200d may correspond to the third and fourth sheet protrusions 190e and 190f of the anode sheet 190, and the third and fourth sheet protrusions 200e and 200f may correspond to the first and second sheet protrusions 190c and 190d of the anode sheet 190. In an embodiment of a stack, where the anode sheet 190 of FIG. 26 and the cathode sheet 200 of FIG. 27 are stacked, the first and second sheet protrusions 200c and 200d of the cathode sheet 200 may be disposed opposite to the third and fourth sheet protrusions 190e and 190f of the anode sheet 190 with protrusions of a separator disposed therebetween, and the third and fourth sheet protrusions 200e and 200f may be disposed opposite to the first and second sheet protrusions 190c and 190d of the anode sheet 190 with protrusions of the separator disposed therebetween. A width of the tab protrusion 200b may be less than widths of the first to fourth sheet protrusions 200c to 200f.

Figure 28:
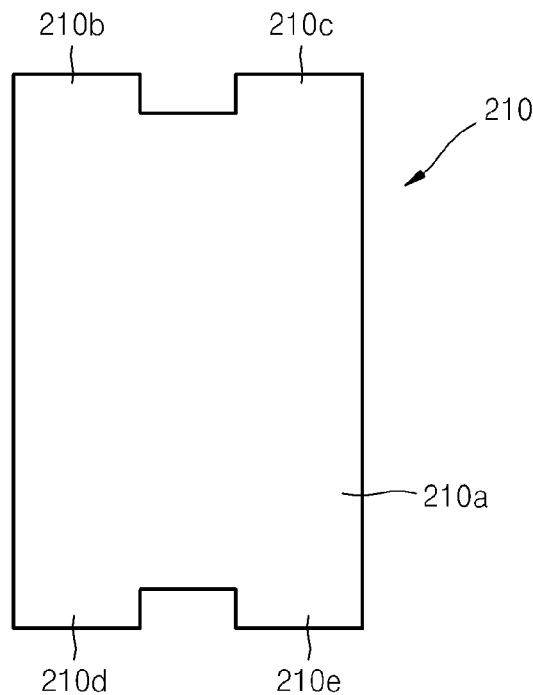
FIG. 28 is a plan view of a separator of a stack type battery according to another embodiment of the invention.

FIG. 28 is a plan view of a separator of a stack type battery according to another embodiment of the invention.

Referring to FIG. 28, an embodiment of a separator 210 includes a main body 210a and first to fourth protrusions 210b, 210c, 210d and 210e. The main body 210a and the first to fourth protrusions 210b, 210c, 210d and 210e may be integrally formed as a single unitary and indivisible unit. In such an embodiment, as shown in FIG. 28, protrusion lengths of the first to fourth protrusions 210b, 210c, 210d and 210e may be substantially the same as each other, but not being limited thereto. In an alternative embodiment, the protrusion lengths of the first to fourth protrusions 210b, 210c, 210d and 210e may be different from one another. The first and second protrusions 210b and 210c are disposed in one side, and the third and fourth protrusions 210d and 210e are disposed in another side. In one embodiment, for example, the first and second protrusions 210b and 210c are disposed in a top end of the main body 210a and the third and fourth protrusions 210d and 210e are disposed in a bottom end of the main body 210a. The first and second protrusions 210b and 210c protrude in a first direction, and the third and fourth protrusions 210d and 210e protrude in a second direction, which is different from the first direction. In one embodiment, for example, the first and second directions may be opposite directions. The first and second protrusions 210b and 210c are substantially symmetrical to the third and fourth protrusions 210d and 210e, respectively, with respect to an imaginary central horizontal line of the main body 210a of the separator 210. Also, the first and third protrusions 210b and 210d are substantially symmetrical to the second and fourth protrusions 210c and 210e, respectively, with respect to an imaginary central vertical line of the main body 210a of the separator 210. The first to fourth protrusions 210b to 210e of the separator 200 may correspond to the first to fourth sheet protrusions 190c to 190f of the anode sheet 190. The first protrusion 210b, the second protrusion 210c, the third protrusion 210d and the fourth protrusion 210e of the separator 200 may correspond to the third sheet protrusion 200e of the cathode sheet 200, the fourth sheet protrusion 200f of the cathode sheet 200, the first sheet protrusion 200c of the cathode sheet 200, and the second sheet protrusion 200d of the cathode sheet 200, respectively.

Figure 29:
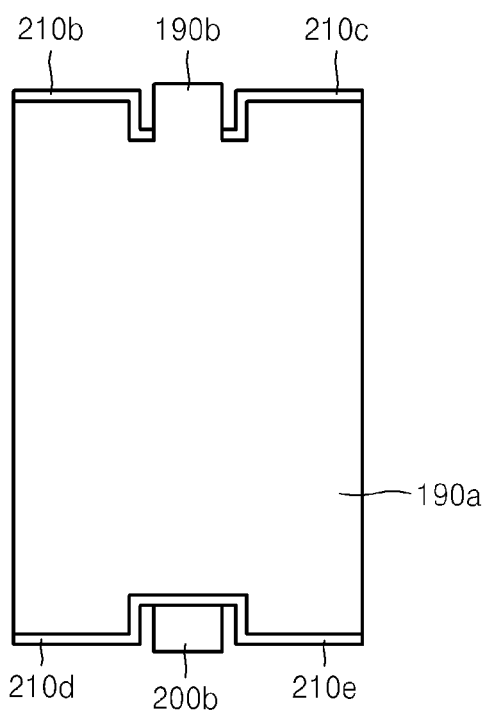
FIG. 29 is a plan view of an embodiment of a unit cell including the cathode sheet of FIG. 27, the separator of FIG. 28 and the anode sheet of FIG. 26, which are sequentially stacked therein.

FIG. 29 is a plan view of an embodiment of a unit cell including the cathode sheet 200 of FIG. 27, the separator 210 of FIG. 28, and the anode sheet 190 of FIG. 26.

Referring to FIG. 29, in an embodiment of the unit cell, the tab protrusion 190b of the anode sheet 190 and the tab protrusion 200b of the cathode sheet 200 are provided at different positions and protrude in opposite directions. The tab protrusion 190b of the anode sheet 190 is disposed between the first and second protrusions 210b and 210c of the separator 210. Distances between the tab protrusion 190b, and the first and second protrusions 210b and 210c of the separator 210 adjacent thereto may be in a range of about 0.001 mm to about 100 mm. The tab protrusion 200b of the cathode sheet 200 is disposed between the third and fourth protrusions 210d and 210e of the separator 210. Distances between the tab protrusion 200b of the cathode sheet 200, and the third and fourth protrusions 210d and 210e of the separator 210 adjacent thereto may be in a range of about 0.001 mm to about 100 mm. In such an embodiment, the first to fourth protrusions 210b to 210e of the separator 210 are disposed between the anode sheet 190 and the cathode sheet 200, and widths of the first to fourth protrusions 210b to 210e of the separator 210 are greater than widths of the sheet protrusions of the anode sheet 190 and the cathode sheet 200.

Figure 30:
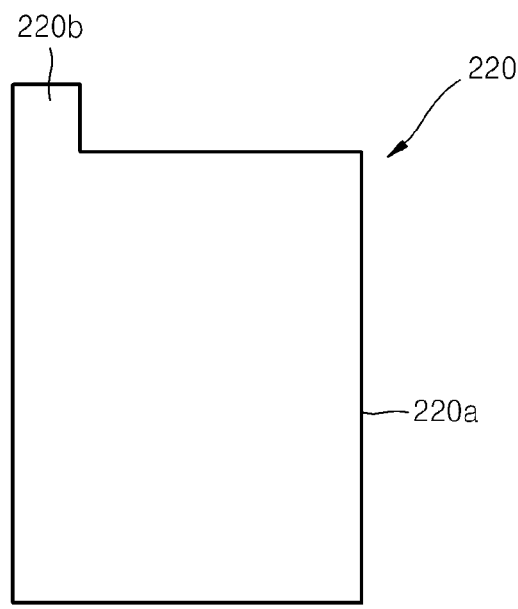
FIG. 30 is a plan view of an anode sheet of a stack type battery according to another embodiment of the invention.

FIG. 30 is a plan view of an anode sheet of a stack type battery according to another embodiment of the invention.

Referring to FIG. 30, an embodiment of an anode sheet 220 includes a main body 220a and a tab protrusion 220b. The anode sheet 220 shown in FIG. 30 may be substantially the same as the anode sheet 130 illustrated in FIG. 16, and any repetitive detailed description thereof will hereinafter be omitted.

Figure 31:
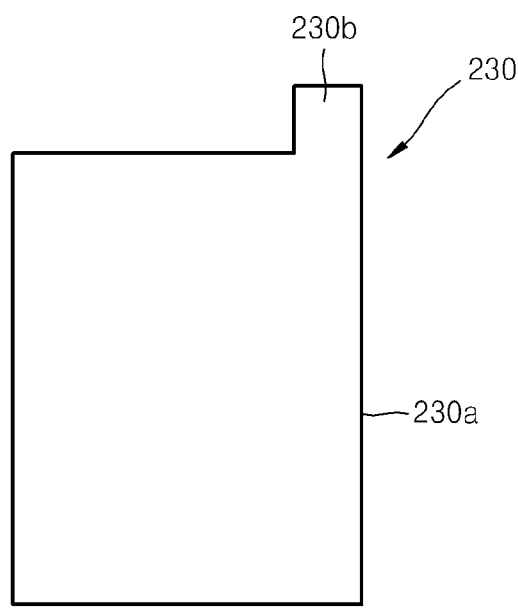
FIG. 31 is a plan view of a cathode sheet of a stack type battery according to another embodiment of the invention.

FIG. 31 is a plan view of a cathode sheet of a stack type battery according to another embodiment of the invention.

Referring to FIG. 31, an embodiment of a cathode sheet 230 includes a main body 230a and a tab protrusion 230b. The cathode sheet 230 shown in FIG. 31 may be substantially the same as the cathode sheet 150 illustrated in FIG. 18, and any repetitive detailed description thereof will hereinafter be omitted.

Figure 32:
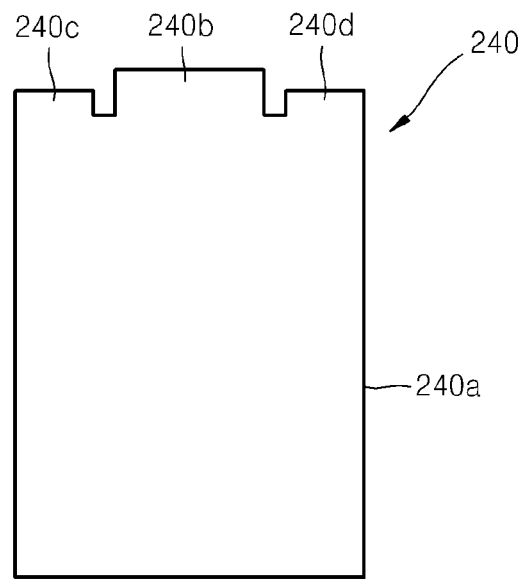
FIG. 32 is a plan view of a separator of a stack type battery according to another embodiment of the invention.

FIG. 32 is a plan view of a separator of a stack type battery according to another embodiment of the invention.

Referring to FIG. 32, an embodiment of a separator 240 includes a main body 240a and first to third protrusions 240b, 240c and 240d. The first to third protrusions 240b, 240c and 240d are disposed in one side of the main body 240a and protrude in a same direction. The first protrusion 240b is disposed between the second and third protrusions 240c and 240d. A protrusion length of the first protrusion 240b is greater than protrusion lengths of the second and third protrusions 240c and 240d. The protrusion lengths of the second and third protrusions 240c and 240d may be substantially the same as each other. In an embodiment of a stack in a stack type battery including the separator 240, the first protrusion 240b of the separator 240 may be used as a position for fixing the stack.

Figure 33:
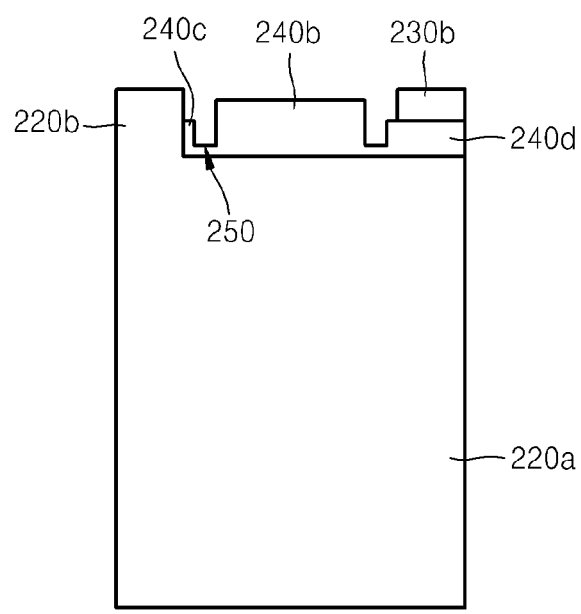
FIG. 33 is a plan view of an embodiment of an unit cell including the cathode sheet of FIG. 31, the separator of FIG. 32 and the anode sheet of FIG. 30, which are sequentially stacked therein.

FIG. 33 is a plan view of an embodiment of a unit cell including the cathode sheet 230 of FIG. 31, the anode sheet 220 of FIG. 30, and the separator 240 of FIG. 32.

Referring to FIG. 33, protrusion lengths of the tab protrusion 220b of the anode sheet 220 and the tab protrusion 230b of the cathode sheet 230 are greater than protrusion lengths of the protrusions 240b, 240c and 240d of the separator 240. Cathode and anode sheets 230 and 220 do not overlap the first protrusion 240b of the separator 240. In such an embodiment, a portion 250 of the main body 240a of the separator between the protrusions 240b, 240c and 240d of the separator 240 may not overlap the first protrusion 240b of the separator 240. In an embodiment of a stack type battery including a plurality of stacks, the stacks may be fixed by bonding the first protrusions 240b of the separators included in the stack type battery with an insulating polymer material.

A stack type battery with increased capacity according to an embodiment of the invention will be described with reference to FIGS. 34 and 35.

Figure 34:
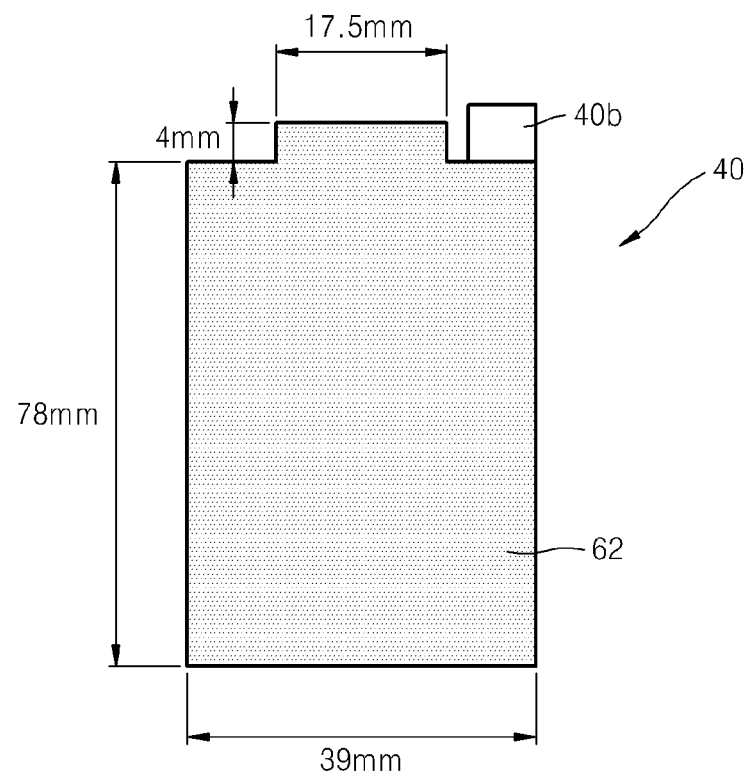
FIG. 34 is a plan view a cathode sheet of one embodiment of the stack type batter, in which a cathode active material layer is provided on the cathode sheet according to an embodiment of the invention.

FIG. 34 illustrates a cathode sheet of one embodiment of the stack type battery in which a cathode active material layer 62 is provided on the cathode sheet. In such an embodiment, the cathode sheet may be substantially the same as the cathode sheet 40 shown in FIG. 2. Referring to FIG. 34, the cathode active material 62 is provided on substantially entire regions corresponding to the main body 40a and the sheet protrusion 40c of the cathode sheet 40.

In one embodiment, as shown in FIG. 34, a length of the main body 40a of the cathode sheet 40 in a vertical direction is about 78 mm, and a length of the main body 40a of the cathode sheet 40 in a horizontal direction is about 39 mm.

An area of the region corresponding to the main body 40a of the cathode sheet 40, in which the cathode active material layer 62 is provided, (hereinafter, referred to as "first area") is about 30.42 square centimeters ($cm^2$) (about 39 mm×about 78 mm). The first area corresponds to a total area of a cathode active material layer of a conventional stack type battery. As shown in FIG. 34, in such an embodiment, the cathode active material layer 62 is provided on an area of the region corresponding to the sheet protrusion 40c of the cathode sheet 40 (hereinafter, referred to as "second area"), which is about 4 mm×about 17.5 mm. The total area (e.g., a sum of the first area and the second area) of the cathode active material layer 62 is about 31.12 $cm^2$. When a capacity of the battery based on the first area, which is the area of the conventional cathode active material layer, is referred to as being 100%, a capacity of the embodiment of the battery based on the total area (e.g., the sum of the first area and the second area) of the cathode active material layer 62 becomes about 102.3%, such that the capacity of the battery is increased to about 2.3%.

Figure 35:
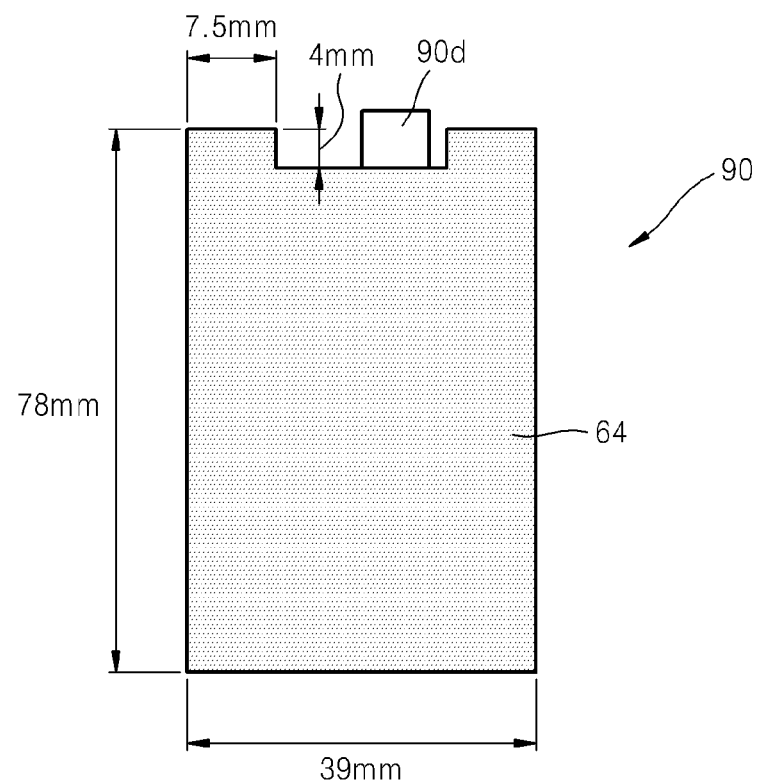
FIG. 35 is a plan view a cathode sheet of one embodiment of the stack type batter, in which a cathode active material layer is provided on the cathode sheet according to an embodiment of the invention.

FIG. 35 illustrates a cathode sheet of one embodiment of the stack type batter in which a cathode active material layer 64 is provided on the cathode sheet. The cathode sheet of FIG. 35 is substantially the same as the cathode sheet shown in FIG. 9.

Referring to FIG. 35, the cathode active material layer 64 is provided on substantially entire regions corresponding to the main body 90a and the two sheet protrusions 90b and 90c of the cathode sheet 90.

In one embodiment, as shown in FIG. 35, a length of the main body 90a of the cathode sheet 90 in a vertical direction is about 78 mm, and a length of the main body 90a of the cathode sheet 90 in a horizontal direction is about 39 mm.

An area of the region corresponding to the main body 90a of the cathode sheet 90, in which the cathode active material layer 64 is provided, (hereinafter, referred to as "third area") is about 30.42 $cm^2$ (e.g., about 39 mm×about 78 mm). The third area corresponds to a total area of a conventional cathode active material layer. As shown in FIG. 35, in such an embodiment, the cathode active material layer 62 is provided on an area of the region corresponding to the two sheet protrusions 90b and 90c of the cathode sheet 90 (hereinafter, referred to as "fourth area"), which is 2×(about 4 mm×about 7.5 mm). Therefore, the total area of the cathode active material layer 64 is about 31.08 $cm^2$.

When a capacity of the battery based on the third area, which is the area of the conventional cathode active material layer, is referred to as being 100%, a capacity of the embodiment of the battery based on the total area (the third area+the fourth area) in the cathode active material layer 64 becomes about 102.2%, such that the capacity of the battery is increased to about 2.2%.

According to embodiments of a stack type battery as described herein, the active material layer is provided on the protrusion of the electrode sheet corresponding to the protrusion of the separator, and the capacity thereof is thereby substantially increased.

While the invention has been particularly shown and described with reference to embodiments thereof, it will be understood by those of ordinary skill in the art that various changes in form and details may be made therein without departing from the spirit and scope of the invention as defined by the following claims.

What is claimed is:

1. A stack type battery comprising:
   a stack comprising:
      a plurality of cathode sheets;
      a plurality of anode sheets, which are alternately disposed with the cathode sheets;
      a plurality of separators, wherein each of the separators is disposed between a corresponding cathode sheet of the cathode sheets and a corresponding anode sheet of the anode sheets; and
      first to third protrusions,
      wherein the first protrusion comprises a portion of the cathode sheets which does not overlap the anode sheets and the separators, the second protrusion comprises a portion of the anode sheets which does not overlap the cathode sheets and the separators,
      at least two protrusions of the first to third protrusions extend from a main body of the stack in a same direction as each other and are spaced apart from each other in a direction perpendicular to a stacking direction and extend in the same direction, and the third protrusion comprises at least a portion of the separators.

2. The stack type battery of claim 1, wherein the third protrusion comprises a portion of the cathode sheets, a portion of the anode sheets and the portion of the separators, which overlap each other.

3. The stack type battery of claim 1, wherein the portion of the separators does not overlap the anode sheets and the cathode sheets.

4. The stack type battery of claim 1, wherein the stack further comprises a fourth protrusion.

5. The stack type battery of claim 4, wherein the fourth protrusion comprises a portion of the cathode sheets, a portion of the anode sheets and a portion of the separators, which overlap each other.

6. The stack type battery of claim 4, wherein the fourth protrusion extends in a same direction as an extending direction of the first to third protrusions.

7. The stack type battery of claim 4, wherein at least two protrusions of the first to fourth protrusions extend in different directions from each other.

8. The stack type battery of claim 2, wherein the stack further comprises:
   an active material layer disposed on the portion of the cathode and anode sheets corresponding to the third protrusion.

9. The stack type battery of claim 5, wherein the stack further comprises:
   an active material layer disposed on the portion of the cathode and anode sheets corresponding to the fourth protrusion.

10. The stack type battery of claim 2, wherein an edge of the portion of the separators corresponding to the third protrusion is inclined.

11. The stack type battery of claim 1, wherein a protrusion length of one of the first to third protrusions is less than a protrusion length of another of the first to third protrusions.

12. The stack type battery of claim 4, wherein protrusion lengths of two protrusions of the first to fourth protrusions are greater than protrusion lengths of the remaining protrusions of the first to fourth protrusions.

13. The stack type battery of claim 1, wherein a distance between adjacent protrusions of the first to third protrusions is in the range of about 0.001 mm to about 100 mm.

14. The stack type battery of claim 4, wherein a distance between adjacent protrusions of the first to fourth protrusions is in the range of about 0.001 mm to about 100 mm.

15. The stack type battery of claim 1, wherein a width of one of the first to third protrusions is different from a width of another of the first to third protrusions.

16. The stack type battery of claim 3, wherein an edge of the portion of the separators corresponding to the third protrusion is inclined.

17. The stack type battery of claim 5, wherein an edge of the portion of the separators corresponding to the fourth protrusion is inclined.

18. The stack type battery of claim 4, wherein a width of one of the first to fourth protrusions is different from a width of another of the first to fourth protrusions.

\* \* \* \* \*